United States Patent [19]
Healy

[11] Patent Number: 6,134,487
[45] Date of Patent: Oct. 17, 2000

[54] AUTOMATED SUSPENSION CORRECTION FOR TWIN I-BEAM SUSPENSIONS

[75] Inventor: Donald A. Healy, Conway, Ark.

[73] Assignee: Snap-On Technologies, Inc., Lincolnshire, Ill.

[21] Appl. No.: 09/130,727

[22] Filed: Aug. 7, 1998

[51] Int. Cl.⁷ ..................................................... G01B 5/24
[52] U.S. Cl. ........................... 701/29; 701/33; 280/86.75
[58] Field of Search .................................. 701/29, 35, 33; 702/95, 97, 150; 33/203; 359/138, 139.04, 139.09; 280/5.52, 5.521, 5.523, 86.75, 86.751

[56] References Cited

U.S. PATENT DOCUMENTS

| | | | |
|---|---|---|---|
| 4,869,527 | 9/1989 | Coddens ................................. | 280/663 |
| 5,208,646 | 5/1993 | Rogers et al. .......................... | 356/152 |
| 5,553,389 | 9/1996 | Winslow et al. ..................... | 33/203.18 |
| 5,598,357 | 1/1997 | Colarelli et al. ........................ | 702/97 |
| 5,909,379 | 6/1999 | Dale, Jr. et al. ........................ | 702/97 |
| 5,948,024 | 9/1999 | O'Mahony et al. . | |
| B1 4,381,548 | 8/1986 | Groossman et al. ..................... | 702/97 |

*Primary Examiner*—Tan Nguyen
*Attorney, Agent, or Firm*—McDermott, Will & Emery

[57] ABSTRACT

A system is disclosed for selecting a replacement adjustment member, and aligning a pair of steerable wheels of a vehicle having a twin I-beam suspension. The steerable wheels are each associated with a suspension angle adjustment member that identifies an offset value and a pair of orientation values. Sensors are provided for generating angular displacement values for each of the steerable wheels. Based on the angular displacement values, a replacement offset value and a pair of orientation adjustment values are determined for each of the steerable wheels. The replacement offset value and the orientation adjustment values are subsequently usable for selecting and installing an appropriate replacement adjustment member on the twin I-beam suspension.

6 Claims, 3 Drawing Sheets

AUTOMATED SUSPENSION CORRECTION FOR TWIN I-BEAM SUSPENSIONS

I. FIELD OF THE INVENTION

The present invention relates to computerized automotive service equipment. More specifically, the present invention relates to an apparatus and method for adjusting alignment angles on twin I-beam suspension vehicles.

II. BACKGROUND OF THE INVENTION

Certain vehicles are constructed with suspensions in which one or both axles are constructed so that each vehicle wheel is connected to a long portion that pivots about a point near the centerline of the undercarriage. In other words, the axle is not a single rod-like member extending across the width of the vehicle with wheels at both ends, but rather two different rod-like members each pivotally extending approximately along half the width of the vehicle. The most notable examples at present include certain passenger trucks manufactured by the Ford Motor Company of Dearborn, Mich. This type of suspension is called a twin I-beam suspension.

Like all suspensions, twin I-beam suspensions must be in proper alignment for the vehicle to operate safely and efficiently. Vehicle service technicians must be able to align such suspensions. There are, however, added complications to correction of alignment angles in twin I-beam suspensions. Such suspensions contain a removable member of roughly ovoid shape (sometimes known as an offset bushing, bushing or cam insert) that must be of a specific size and angular orientation with relation to the I-beam. The placement of the bushing of a particular size in a particular angular orientation affects two important suspension angles: camber and caster. The placement of the bushing simultaneously affects both camber and caster.

When a twin I-beam suspension is out of alignment, it is sometimes necessary to remove the bushing and replace it with a different one. Care must be taken in the selection and insertion of a replacement bushing. For example, if caster is out of alignment but camber needs no adjustment, one cannot simply select a bushing that corrects for caster. Fixing caster while ignoring camber would then put camber out of alignment.

Twin I-beam vehicles are supplied at the factory with a factory installed bushing. Such OEM bushings are constructed not to rotate. They are of a particular size (sometimes known as "offset") and are installed at a particular angle that does not change. Since they do not rotate, they automatically correspond to a particular caster and camber rating, which are conveniently stamped onto the bushing. These numbers correspond to the addition to measured caster angle and to measured camber angle, respectively, that they cause when inserted into a suspension. While the factory installed bushings might not change, general wear and use of the vehicle can create misalignments in the angles they affect. In such cases, it is only by proper replacement of such OEM bushings by an aftermarket bushing that camber and caster may be adjusted.

Aftermarket bushings differ from OEM bushings. They are rated for a particular size (offset) but are not rated for particular camber and caster angles. The addition to camber and caster that their insertion causes is determined by the angular orientation to which they are turned by insertion. Hence, to correct camber and caster alignment in a twin I-beam suspension vehicle, a vehicle technician is faced with two different angles (camber and caster) each affected by two different variables within potential replacement parts (offset and angular orientation). This can be confusing.

It has been common for vehicle technicians to choose the size and orientation of replacement bushings by trial and error. This is time consuming, leads to substantial possibility for error, and results in frustration to the service technician. Some vehicle repair establishments do not perform alignment adjustment on twin I-beam vehicles because of the perceived and actual difficulty of the procedure, and the substantial possibility of returning the vehicle to its owner in worse shape than it came.

Another problem is when a subsequent angle adjustment is necessary. In this case, the twin I-beam vehicle no longer has a factory installed bushing, but rather has a previously inserted aftermarket bushing. As mentioned, aftermarket bushings do not have camber and caster ratings stamped on them. Thus the service technician must determine, prior to commencing the alignment angle adjustment, the actual value of camber and caster that is measured that is attributable to the previously inserted aftermarket bushing. Only then may the technician meaningfully determine from the camber and caster measured values and specification values the necessary rating (offset and angular orientation) of any subsequent correcting aftermarket bushing.

What is needed is automotive service equipment that assists service technicians in the selection of the size and angular orientation of replacement bushings. Further, what is needed is automotive service equipment that assists in replacement of previous aftermarket bushings.

III. DESCRIPTION OF THE FIGURES

IV. SUMMARY OF THE INVENTION

The present invention overcomes the disadvantages of the prior art by providing a computerized easy to use system for instructing an automotive service technician in how to replace twin I-beam suspension bushings. The invention does so by providing one or more display screens asking for information relating to the system under test, including parameters related to already installed bushings. When the installed bushing is factory installed, the parameters include the camber and caster values stamped on the part. When the installed bushing is aftermarket installed, a special procedure is provided to easily and accurately ascertain the pertinent parameters for entry into and use by the computerized vehicle wheel alignment system. At the end of the process, the computer display instructs the operator in the size and angular orientation for any replacement bushing.

V. DETAILED DESCRIPTION

Figure 1:
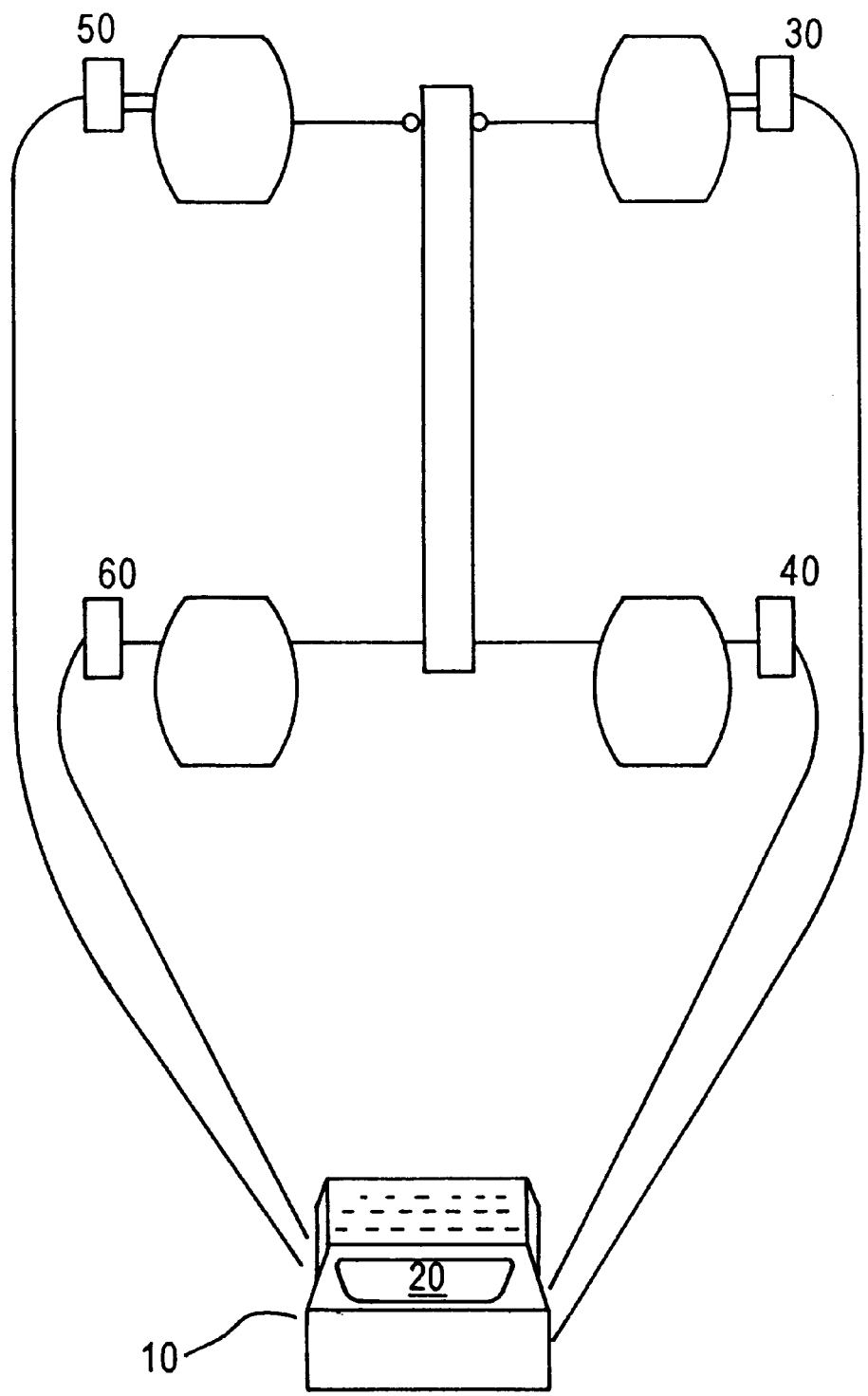
FIG. 1 shows a top view stylized configuration for a typical wheel alignment system.

The detailed description of the inventions herein should be deemed exemplary rather than limiting. The inventions themselves are defined by the claims, appended hereto. In one embodiment, the invention includes a computerized wheel alignment service equipment system. FIG. 1 shows the configuration for a typical wheel alignment system. Computer 10 is connected to a display 20 and to respective vehicle wheel angle sensors 30, 40, 50 and 60, one for each wheel. The sensors 30, 40, 50 and 60 measure real-time vehicle wheel angle measurements, such as for camber, caster, toe, etc., and transmit the raw data to computer 10, which then interprets the raw data for computation and display on display 20. Specification values for the particular vehicle under test are retrieved from memory in computer 10, and compared with real time measurements. Display 20 instructs the service technician how much and in what direction to adjust the suspension or associated parts to correct the pertinent wheel angles to be within specification value. The preferred system for use in the present invention is the Visualiner series, manufactured by John Bean Co., an affiliate of the assignee herein.

Figure 2:
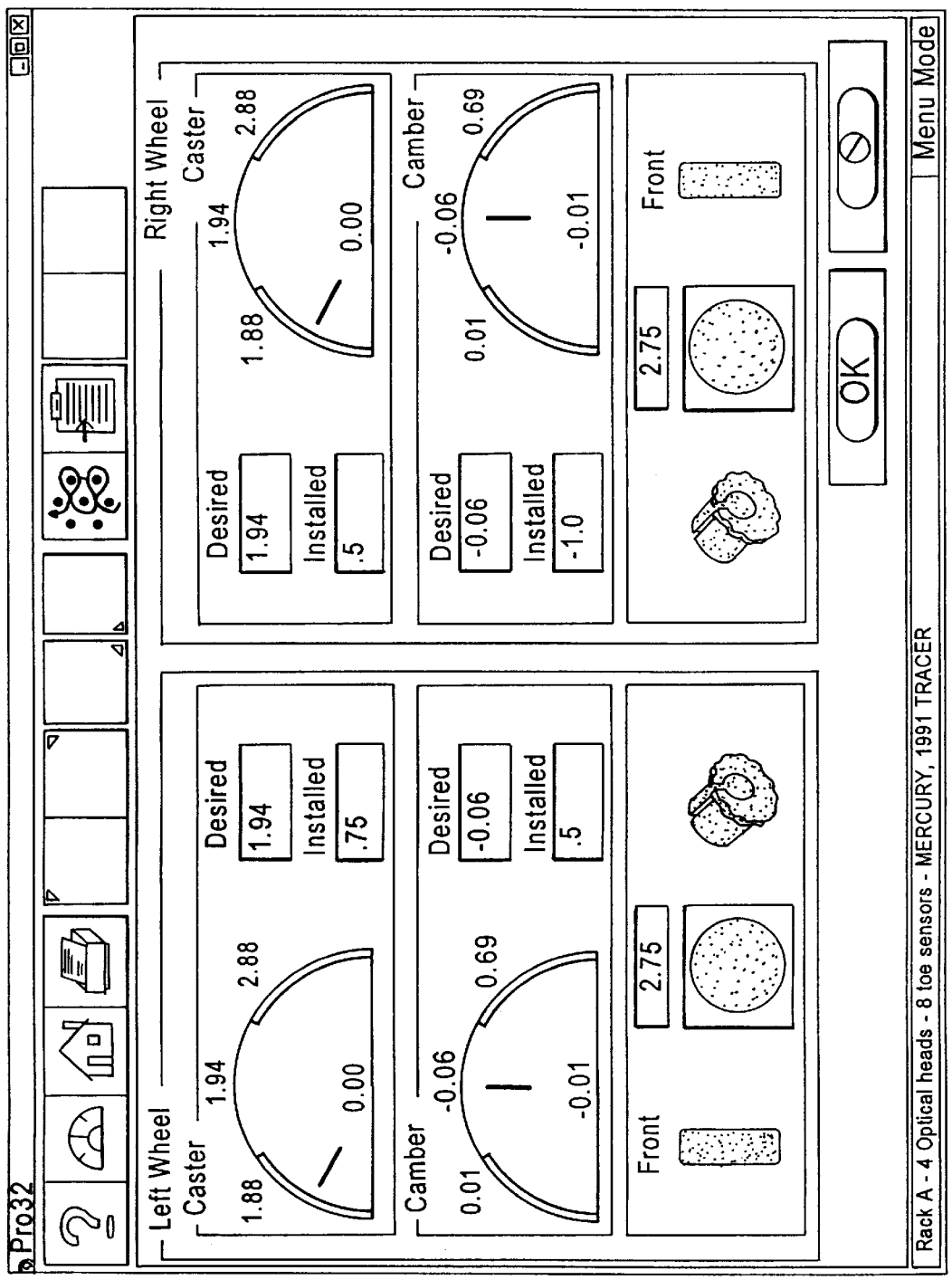
FIG. 2 shows an exemplary display screen of an embodiment of the present invention.
Figure 3:
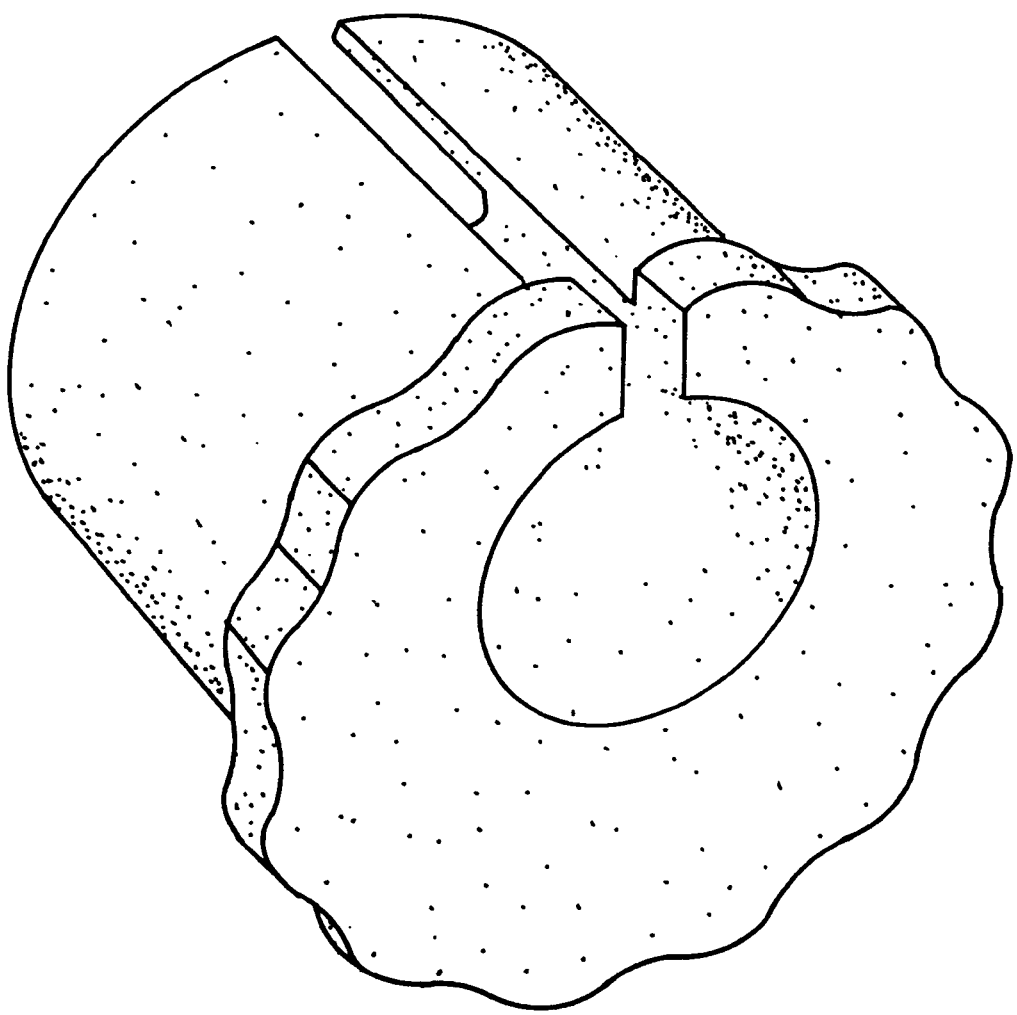
FIG. 3 shows a typical aftermarket bushing.

Replacement of a factory installed bushing according to the present invention will now be described. The bushing's camber and caster values are stamped on its face. When a twin I-beam suspension vehicle is under test, it is connected to sensors, such as sensors 30, 40, 50 and 60 of FIG. 1. Then several prompts appear on the display 20 for entry by an operator. FIG. 2 shows an exemplary display screen of the present invention. In this embodiment, there are eight different fields that must be entered, namely the desired (i.e., specification) value for camber and caster for both front wheels (left and right), as well as the installed value for camber and caster for both front wheels. In this embodiment, the four pertinent real time values are already within the computer memory, but in an alternative embodiment, those values may be shown as fields as well, for instance when the vehicle sensors are not operating and real time readings must be taken mechanically. In the case where the vehicle under test contains factory installed bushings, the installed value is obtained by inspection, i.e., by reading it off the face of the bushing. Such numbers are then entered into the fields provided. Once these eight (or alternatively twelve) values are entered, the user indicates "OK", at which point the computer calculates the offset value and angular orientation of the aftermarket bushing required to effect any correction in any wheel that is out of specification for camber and/or caster. An exemplary aftermarket bushing is depicted in FIG. 3. Note that it is stamped with an offset size (defined as the angle adjustment it causes to camber or caster when installed at its angle of maximum impact on camber or caster, respectively), but not with pre-rated camber and caster values.

The algorithm for the aftermarket replacement bushing calculation will now be described. For each wheel, six raw variables are needed. These are: specification values for both camber and caster, present real time readings for camber and caster, and the installed amount of camber and caster attributable to the existing bushing. From these raw values, the amount of camber and caster change needed, respectively, are calculated:

[1] Caster Change Needed=Desired Caster−(Present Caster−Installed Caster).

[2] Camber Change Needed=Desired Camber−(Present Camber−Installed Camber).

Next, a ratio is obtained of caster to camber change needed:

[3] Change Ratio=Caster Change Needed÷Camber Change Needed.

The ratio of the Caster Change Needed to the Camber Change Needed permits the determination of the angle at which any aftermarket correction bushing must be installed. This is because it establishes the ratio by which a correction needs to be made in the caster angle compared to the camber angle. The value matches closely the ration of Cosine (ANGLE) to Sine(ANGLE). The amount of addition to caster attributed to the replacement part equals Cosine (ANGLE)×offset size, and the amount of addition to camber attributed to the replacement part equals Sine(ANGLE)× offset value.

Once the change ratio is obtained, the value ANGLE may be ascertained with an arccotangent function (inverse cotangent). Alternatively, a loop may be performed that analyzes all angles from 0 to 90 degrees in one degree steps, with a comparison between the cotangent of the loop index with the value of the change ratio. On the step where the cotangent of the loop index first becomes less than or equal to the change ratio, that particular loop index will at that point be approximately equal to ANGLE, and henceforth that particular loop index will represent the angle between 0 and 90 degrees at which the aftermarket bushing should be installed. Because the arccotangent finction is ambiguous as to sign, the actual angle might be between 91 and 359 degrees. Thus the proper quadrant must be obtained. The following exemplary text, modeled after C code, shows how this is done, where FIND DEGREE is the loop index (and hence the 0 to 90 degree angle) as hereinbefore described.

```
PUT ROTATION IN PROPER QUADRANT FOR LEFT WHEEL BY:
    IF CAMBER CHANGE NEEDED <0 AND CASTER CHANGE
    NEEDED >0
        FIND DEGREE = 180 – FIND DEGREE
    ELSE
        IF CASTER CHANGE NEEDED >0
            FIND DEGREE = 180 + FIND DEGREE
        ELSE
            FIND DEGREE = 360 – FIND DEGREE
        ENDIF
    ENDIF
PUT ROTATION IN PROPER QUADRANT FOR RIGHT WHEEL BY:
    IF CAMBER CHANGE NEEDED <0
        IF CASTER CHANGE NEEDED <0
            FIND DEGREE = 360 – FIND DEGREE
        ELSE
            FIND DEGREE = 180 + FIND DEGREE
        ENDIF
    ELSE
        IF CASTER CHANGE NEEDED >0
            FIND DEGREE = 180 – FIND DEGREE
        ENDIF
    ENDIF.
```

After ANGLE is found (as represented by the FIND DEGREE variable), the offset value of the aftermarket bushing may be calculated. Then, both the angle of installation and the size of the bushing are known and can be displayed to the operator. More specifically, offset size is found by the following algorithm. It will be seen that Caster Change Needed or Camber Change Needed may be used to calculate offset bushing size, but that the one with the largest value is used since it tends to produce more accurate results.

```
IF ABSOLUTE VALUE OF CAMBER CHANGE NEEDED>
    ABSOLUTE VALUE OF CASTER CHANGE NEEDED
    SHIM SIZE = CAMBER CHANGE NEEDED ÷ SINE(FIND
    DEGREE)
        (IF SINE(FIND DEGREE) = 0 THEN SHIM SIZE = 0)
ELSE
    SHIM SIZE = CASTER CHANGE NEEDED ÷ COSINE(FIND
    DEGREE)
        (IF COSINE(FIND DEGREE) = 0 THEN SHIM SIZE = 0)
ENDIF.
```

The variable SHIM SIZE is the approximate offset size for a replacement aftermarket bushing. Such aftermarket bushings are typically manufactured in 0.25 degree increments. Thus SHIM SIZE must be rounded to a suitable manufactured offset bushing size. Any software rounding routine will adequately perform this task.

Once the operator indicates OK after entering the pertinent raw values, the foregoing calculations are performed.

At that point, a visual display representing size (SHIM SIZE) and angle (FIND DEGREE) of any replacement aftermarket bushing is shown on the display 20.

As discussed, one of the necessary raw values for the foregoing calculations is the amount of real time camber and caster attributable to the installed bushing for each wheel. As mentioned, such amounts are stamped on factory installed parts, but are not stamped on aftermarket parts. Only the size rating of the aftermarket parts is stamped on the aftermarket bushings. In another embodiment, computer 10 is used to ascertain the amount of camber and caster attributable to an aftermarket installed bushing, so that the operator may more easily determine the values for variables Caster Installed and Camber Installed, for use in equations [1] and [2], above. This embodiment makes use of the quality of aftermarket bushings, that they can be rotated in place.

First, the initial real time camber and caster readings for a particular wheel must be determined and stored (Initial Caster and Initial Camber). Next, installed offset bushing size is ascertained. In one embodiment, the computer display 20 directs the operator to determine installed offset bushing size by rotating the offset bushing until the slot of the offset bushing (or other designated reference point) is perpendicular to the geometric centerline of the vehicle. When this is done, the operator indicates this to the computer by any known operator feedback means, such as by pushing a button, or actuating a switch. The computer 10 obtains and stores a first new camber reading (CAMBER1). Then, the computer display 20 directs the operator to rotate the offset bushing 180 degrees. Again, the operator does so, and indicates completion of this task to the computer 10. The computer 10 obtains and stores a second new camber reading (CAMBER2). Offset bushing size, then, equals half the difference of these two values, (CAMBER1−CAMBER2)÷2.

In a second embodiment for obtaining installed aftermarket offset bushing size, the display directs the operator to perform the following tasks, and the computer obtains and stores the pertinent variables as before: Rotate offset bushing until slot or other designated reference point is parallel to the geometric centerline of the vehicle; obtain CASTER1; rotate offset bushing 180 degrees; obtain CASTER2; and calculated offset bushing size from (CASTER1−CASTER2)÷2.

In a third embodiment for determining installed aftermarket offset bushing size, the display directs the operator to rotate the installed offset bushing 360 degrees. During the course of the rotation, the computer senses and captures the minimum and maximum camber and caster values automatically. In this instance, offset bushing size is equal either to (Maximum Camber Point−Minimum Camber Point)÷2 or (Maximum Caster Point−Minimum Caster Point)÷2.

In yet another embodiment, offset bushing size can be ascertained by rotating the offset bushing by an amount less than or equal to 180 degrees from any starting orientation. This is because the offset bushing must cause the measured value for at least one of camber or caster to cross a minimum or maximum during that rotation. Hence, the position of maximum/minimum caster negates the effect of the offset bushing on the value of measured wheel camber, since the entirety of the offset bushing is in that case in the caster direction. Likewise, the position of maximum/minimum camber negates the effect of the offset bushing on the value of measured wheel caster. Thus, the size of the offset bushing in the case of an arbitrary 180 degree turn may be determined by the difference between the value of maximum/minumum camber and the value of camber at the point of maximum/minimum caster (and conversely).

Based on the above, it will also be appreciated that an incremental rotation of the aftermarket offset bushing by any perceptible amount (such as 1 degree) will provide sufficient data for computer 10 to determine the amount and direction of change in both measured wheel camber and measured wheel caster. With such data, using the principles explained above, offset bushing size may be calculated.

Once the aftermarket offset bushing size is determined, in whatever way appropriate, the computer then determines the value of caster and camber as if no offset bushing was installed (zero value offset bushing) by subtraction.

[4] Camber Without Shim=Maximum Camber Point−Shim Size.

[5] Caster Without Shim=Maximum Caster Point−Shim Size.

Installed caster and camber may now be determined from the following equations:

[6] Installed Caster=Initial Caster Reading−Caster Without Shim.

[7] Installed Camber=Initial Camber Reading−Camber Without Shim.

Of course, equations [6] and [7] require that both real time camber and real time caster be obtained in reaching the results. Alternatively, installed caster and camber may be determined using only one of caster or camber. First, this alternative method will be described in terms of caster. In this case, equation [6] is performed as above; equation [7] is replaced by [8]:

[8] Installed Camber=Sine (Arc Cosine (Installed Caster÷Shim Size))×Shim Size.

Display 20 instructs the operator to rotate the offset bushing counterclockwise. For a right front wheel, if when the aftermarket offset bushing is rotated counterclockwise and the caster starts changing in a positive direction, then the Installed Camber must be negative; otherwise it is positive. For a left front wheel if when the offset bushing is rotated counterclockwise and the caster starts changing in a positive direction, then the Installed Camber must be positive; otherwise it is negative.

If this alternative method is performed with respect to camber, then equation [7] remains unchanged, and equation [6] is replaced by equation [9]:

[9] Installed Caster=Cosine (Arc Sine (Installed Camber÷Shim Size))×Shim Size.

Display 20 directs the operator to turn the offset bushing counterclockwise. For a right front wheel, if when the offset bushing is rotated counterclockwise the camber starts changing in a negative direction, then Installed Caster must be negative. Otherwise it is positive. The opposite is true for a left front wheel.

The offset bushing values for an aftermarket offset bushing are now separated into their contributions to camber and caster, respectively. At this point, the required replacement angle and size may be ascertained with the procedure described for factory installed offset bushings, as hereinbefore described.

It will be appreciated that the embodiments described above are merely exemplary and should not be perceived as limiting, and that the rights granted in these letters patent are defined by the following claims. For example, while the display of FIG. 2 shows that specification values are entered by the operator as a field, they can just as easily be provided by a database of specification values, leaving only the four bushing-related fields for user entry. For another example, the foregoing invention is not limited to twin I-beam suspensions per se, but has application in any suspension that makes use of eccentric or offset bushings, cams or similar devices to influence any suspension alignment angle.

I claim:

1. A system for selecting a replacement adjustment member and aligning a pair of steerable wheels of a vehicle having a twin I-beam suspension, each of the steerable wheels being associated with a suspension angle adjustment member that identifies an offset value and a pair of orientation values, said system comprising:

at least one sensor coupled to each steerable wheel for generating one or more angular displacement values;

a computer operatively coupled to said at least one sensor, said computer including:

one or more processors executing one or more sequences of instructions; and a computer-readable medium carrying one or more sequences of instructions for aligning the pair of steerable wheels;

wherein execution of the one or more sequences of instructions by one or more of the processors causes the one or more processors to:
   receive said one or more angular displacement values,
   determine a replacement offset value, for each of the steerable wheels, that identifies an appropriate size for the replacement adjustment member, and
   determine a pair of orientation adjustment values, for each of the steerable wheels, that specifies orientation of the replacement adjustment member for proper installation on the twin I-beam suspension.

2. The vehicle wheel alignment system of claim 1, wherein said one or more angular displacement values include at least a caster angle and a camber angle.

3. A method of selecting a replacement adjustment member and aligning a pair of steerable wheels of a vehicle having a twin I-beam suspension, each of the steerable wheels being associated with a suspension angle adjustment member that identifies an offset value and a pair of orientation values, the method comprising the steps:

generating one or more angular displacement values for each steerable wheel;

determining a replacement offset value for each steerable wheel;

determining a pair of orientation adjustment values for each steerable wheel;

selecting a replacement adjustment member based on the replacement offset value; and installing the replacement adjustment member on the twin I-beam suspension based on the pair of orientation adjustment values.

4. The method of claim 3, wherein the step of generating includes the steps:

generating a real-time camber angle value for each steerable wheel; and generating a real-time caster angle value for each steerable wheel.

5. The method of claim 3, wherein the step of determining a pair of orientation offset values comprises the steps:

determining a caster change angle based on a default caster angle, a real-time caster angle, and the orientation values identified by the suspension angle adjustment member; and determining a camber change angle based on a default camber angle, a real-time camber angle, and the orientation values identified by the suspension angle adjustment member.

6. The method of claim 5, wherein the step of determining a replacement offset value comprises a step of determining the replacement offset value based on the caster change angle and the camber change angle.

* * * * *